Patented Apr. 13, 1948

2,439,610

UNITED STATES PATENT OFFICE 2,439,610

STABILIZED ORGANIC COMPOSITION

Rupert C. Morris and John L. Van Winkle, Berkeley, and Alva V. Snider, Richmond, Calif., assignors to Shell Development Company, San Francisco, Calif., a corporation of Delaware No Drawing. Application September 26, 1944, Serial No. 555,892

12 Claims. (Cl. 252—45)

1

This invention relates to organic compositions which have been improved in one or more respects by the incorporation of certain polymeric additives. In one of its preferred embodiments the invention may be exemplified by improved compounded lubricants, such as refined petroleum or mineral oil compositions, which contain the herein-described sulfurized and/or halogenated hydrocarbon polymers.

One object of the invention is to produce lubricating compositions containing diolefin polymers of regulated molecular weight, which polymers contain chemically combined sulfur and/or halogen in a stable and beneficial form. Another purpose is to provide new petroleum-base compounded oils and greases effective under conditions of extreme pressure and/or possessing improved viscosity indices and/or other beneficial properties. A further object is to product organic compositions having improved anti-oxidant or anti-corrosive properties. Additional objects will be apparent from the following description and claims.

It has been suggested that saturated or substantially saturated high molecular weight organic polymers may be added to lubricating oil. Such compounds have been produced, for example, by condensation of mono-olefins so that the final polymer is also a mono-olefin—that is, there is but one double bond in the total polymer, which polymer may have a molecular weight of thousands.

If attempts are made to introduce sulfur or chlorine in such compounds it may proceed along any or all of three lines. These are: (1) addition to the lone olefinic bond, which procedure by itself obviously produces a compound of minute sulfur or chlorine content; (2) substitution of sulfur or chlorine; since such substitution is never attained uniformly throughout the molecule, the product obtained is thus as a rule not very satisfactory and may also be unstable, giving off HCl or H₂S under lubricating conditions, as when exposed to relatively high temperatures; in addition, such substances are generally dark-colored and those containing sulfur may also possess an objectionable mercaptan-like odor; (3) introducing sulfur or chlorine into such polymers by reaction at conditions that will cause depolymerization or scission of the polymer molecule; this likewise

2 results in non-uniform sulfurization or chlorination as well as production of a mixture of polymers and by-products of widely varying molecular weights and properties.

It has now been found, however, that alkyl-substituted 1,3-pentadienes, such as 2-methyl-1,3-pentadiene, 3-methyl-1,3-pentadiene, 4-methyl-1,3-pentadiene, 2-ethyl-1,3-pentadiene, 3-ethyl-1,3-pentadiene, 4-ethyl-1,3-pentadiene and higher homologues, may be polymerized and subsequently treated to yield a large series of varied substances which have a particular utility as additives for lubricating compositions such as petroleum or refined mineral oil.

It will be seen that the present starting compounds are characterized (in addition to being conjugated diolefins) by the presence of a tertiary carbon atom attached to a double bond. This is very advantageous for the present purposes. Thus, the basic structure

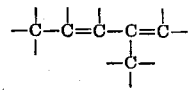

may yield a linear polymer by 1,4-polymerization to give the structure

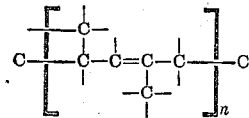

or a 1,2 polymerization to yield

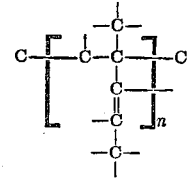

as well as a mixture of these types or it may form a cyclic polymer, according to the conditions of polymerization.

Individual compounds or mixtures of alkyl substituted 1,3-pentadienes (which may contain the same or different alkyl substituents) may be empolyed as starting material. One convenient starting material, for example, is the mixture obtained from dehydrating 2-methyl-2,4-pentanediol, which mixture is about 85% 2-methyl-1,3-pentadiene and about 15% 4-methyl-1,3-pentadiene. It is also to be understood that the conjugated diolefins may contain other organic or inorganic substituents which do not interfere with the reaction. Thus, for instance, the unattached bonds on the carbon atoms in the foregoing paragraph may be connected to hydrogen atoms, halogen atoms, sulfur atoms, low molecular weight alkyl radicals, etc.

Depending upon the reaction conditions, the present diolefins may be polymerized either to low molecular weight cyclic polymers or to higher molecular weight linear polymers. To obtain the cyclic polymer, the alkyl substituted 1,3-pentadiene may be reacted with sulfur dioxide to yield a mixture of low molecular weight cyclic polymer and dialkyl sulfolene having the basic structure

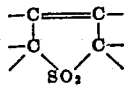

An elevated temperature on the order of 100° C. is employed and the conversion is conveniently effected under elevated pressure as in an autoclave. Peroxides or other oxidation catalysts may be present but generally they are unnecessary. A reaction time of about 0.5 to 1 hour is generally adequate.

About 50% of this polymer formed from conjugated methyl pentadienes contains four to six monomeric units, the remainder containing up to about ten units and averaging about six to seven. The sulfolene simultaneously formed may be heated at atmospheric pressure and at a minimum temperature of about 86° C. to yield sulfur dioxide and more of this same cyclic polymer by decomposition or cracking of the sulfolene in practically quantitative amount. This result is unique since a corresponding treatment of the sulfolenes obtained from butadiene, isoprene, 2,3-dimethylbutadiene-1,3 and similar compounds results in depolymerization to the monomer and sulfur dioxide.

Cyclic polymers thus formed from low molecular weight alkyl substituted 1,3-pentadienes (i. e., having up to about 10 carbon atoms in the monomer) are liquids. This liquid polymer from methyl 1,3-pentadienes is yellowish-brown in color. It may be stabilized by heating for a few hours at about 200° C.–225° C. This results in a more uniform product, removing the last traces of SO₂ and lower polymers. The stabilized product is free of sulfur and, in large part, appears to be formed of aproximately 7 to 8 units of methyl pentadiene. Its molecular weight is in the neighborhood of 600 and it boils above 250° C.

High molecular weight linear polymers, on the other hand, may be produced from the present alkyl substituted 1,3-pentadienes by a number of methods. For example, perborates, persulfates, peroxides and similar catalysts are quite effective about 40° C.–60° C. to effect polymerization in aqueous emulsion or such polymerization may be accomplished wth a diazoamino aryl catalyst such as diazoaminobenzene at a temperature in the neighborhood of about 90° C.

The present alkyl substituted 1,3-pentadienes may also be polymerized with stannic chloride or other Friedel-Crafts catalysts such as are listed by Calloway in Chem. Rev. 17, 327 (1925). When this polymerization is carried out at a low temperature such as below —50° C., rubber-like, substantially colorless polymers are obtained which are extremely elastic and strong. When the polymerization is carried out at elevated temperatures such as above 50° C., the cyclic hexamer liquid polymer previously described may be obtained. At intermediate temperatures a linear, high molecular weight, non-rubbery polymer is produced. Any of these polymers may be reacted with sulfur and chlorine according to the present invention.

These alkyl substituted 1,3-pentadienes may also be cross polymerized with (usually minor amounts of) divinyl benzene, piperylene, isoprene, butadiene and other conjugated diolefins under similar conditions. The designation, alkyl substituted 1,3-pentadiene polymer, as used herein and in the appended claims, is taken to include the copolymers of the alkyl substituted conjugated pentadienes with other polymerizable organic substances as well as homo polymers containing only the alkyl substituted 1,3-pentadienes.

The linear polymers, when of sufficiently high molecular weight, may be added to organic compositions such as lubricating oil to improve the viscosity index. However, both the cyclic and the linear polymers may be sulfurized and/or chlorinated to yield additives possessing anti-oxidant and/or extreme pressure properties. As a general rule, it may be said that the sulfurized polymers are anti-oxidant or anti-corrosive agents; the chlorinated polymers and to a lesser extent the sulfurized polymers are "extreme pressure" additives, while polymers which have been both sulfurized and chlorinated possess properties roughly corresponding to the amounts of sulfur and chlorine introduced.

A particular advantage of such compounds is that sulfur or halogen is incorporated in the polymers by addition rather than by substitution so that the temperature necessary for such sulfurization or chlorination is below that which causes depolymerization. The reaction time required to produce the present products is likewise correspondingly less. The products are also more stable as well as more oil soluble than the sulfurized and chlorinated polymers known to the art. Again, hydrogen sulfide or hydrogen halide which are produced in sulfur or halogen substitution reactions are substantially absent in the present addition sulfurization or halogenation processes so that the supply of reagent is not dissipated by a production of undesirable by-products.

Most important, as contrasted with the compounds of the prior art, the presence of an olefinic bond in each monomeric unit of the polymer permits the incorporation of a very considerable amount of sulfur and/or halogen in the polymer, even, if desired, without the production of a saturated product. Thus, the methyl pentadiene unit has a molecular weight of 82. Upon complete saturation, with either sulfur or chlorine, to each of these units would be added one molecule of sulfur or $$\frac{32}{32+82}=28\% \text{ w.}$$

or one molecule of $$Cl_2 \frac{71}{71+82}=46.5\% \text{ w.}$$

A very stable and satisfactory product, however, may usually be made by incorporating only about 8%–15% w. of sulfur or about 10%–20% of chlorine in the polymer.

Although the hydrocarbon polymers having precipitated co-polymer was washed and dried in the usual manner.

| Example No. | A | B | C | D | E | F | G | H | J |
|---|---|---|---|---|---|---|---|---|---|
| Butadiene, parts | 5 | 10 | 10 | 20 | | | 10 | 20 | 20 |
| Isoprene, parts | | | | | 5 | 10 | | | |
| MPD,[1] parts | 95 | 90 | 90 | 80 | 95 | 90 | 90 | 80 | 80 |
| Poly. time, hrs | 16 | 16 | 11 | 11 | 16 | 16 | 11 | 11 | 16 |
| Yield, per cent | 82 | 95 | 79 | 86 | 85 | 90 | 79 | 80 | 95 |

[1] Mixture of about 85% of 2-methyl-1,3-pentadiene with about 15% of 4-methyl-1,3-pentadiene.

Example VII.—Copolymerization with isobutylene

A mixture of 288 gm. of conjugated methyl pentadienes was dissolved in a mixture of 288 gm. isobutylene and 1600 cc. ethylene. The temperature of the mixture was —100° C. There was then added dropwise with stirring a solution of 5.77 gm. aluminum chloride in 80 gm. ethyl chloride. The reaction mixture was stored for one hour and then worked up as described in Example II. The conversion to polymer was approximately 99%. The polymer was a clear semi-solid which had a molecular weight of 18,000 as determined by viscosity measurements.

Example VIII.—Copolymerization with alpha methyl styrene

A mixture of 360 gm. of conjugated methyl pentadienes was dissolved in a mixture of 40 gm. alpha methyl styrene and 1750 cc. propane. The reaction mixture was cooled to —75° C. There was then sprayed in with stirring 4 gm. aluminum chloride dissolved in a small amount of ethyl chloride. The reaction mixture was stored for two hours and then worked up as described in Example II. The conversion to polymer was approximately 92%. The polymer was a nearly colorless stiff semi-solid which had a molecular weight of 42,000 as determined by viscosity measurements.

Example IX.—Sulfurization of cyclic polymer

In a flask with a stirrer attached and under a nitrogen atmosphere was charged 246 gm. cyclic methyl pentadiene polymer. To this was added during 25 minutes at 140° C.–160° C., 35 gm. flowers of sulfur. The reaction mixture was then heated at 150° C.–164° C. for 5 hours and 35 minutes. It was then dissolved in isopentane and filtered to remove any free sulfur. There was obtained 271 gm. sulfurized methyl pentadiene polymer representing a 99.6% conversion. The sulfurized methyl pentadiene polymer contained 11.5% sulfur and had a molecular weight of 520 as determined by viscosity measurements.

A 10% solution of this sulfurized methyl pentadiene polymer in hydrol (white mineral oil) was heated with a clean bright lustrous copper strip for 8 hours at 100° C. At the end of this time there was absolutely no discoloration of the bright copper surface.

The sulfurized polymer was also heated continuously at 160° C.–180° C. for 24 hours and showed no apparent decomposition at the end of this period.

Example X.—Sulfurization of linear polymer

In a flask with a stirrer attached and under a nitrogen atmosphere was charged 100 gm. of the methyl pentadiene polymer of Example V. To this was added portionwise 13 gm. flowers of sulfur at 168–177° C. The reaction mixture was then treated at 168—177° C. for seventeen hours. There was obtained a nearly quantitative yield of sulfurized methyl pentadiene polymer. The sulfurized methyl pentadiene polymer contained 11.5% sulfur.

The sulfurized methyl pentadiene polymer was a reddish brown, semi-soft, resin-like material which was easily soluble in mineral oil.

The conjugated methyl pentadiene copolymers may be sulfurized in the same manner to produce a correspondingly satisfactory product.

Example XI.—Chlorination

To a stirred solution of 200 gm. cyclic methyl pentadiene polymer in 500 gm. $CCl_4$, 23 gm. of chlorine was bubbled while the temperature was held between 15° C.–30° C. for about 0.5 hour. Upon completion the $CCl_4$ was removed from the reaction mixture by flash distillation. There was recovered 223 gm. of product representing a 100% conversion. The product contained 10.3% chlorine and was a viscous liquid. Upon removal from the reaction chamber, the chlorinated polymer was dark-colored but upon the addition of a small amount (less than 1%) of saturated alkyl amines containing about 16–18 carbon atoms, it immediately became a permanent light yellow color.

The linear conjugated methyl pentadiene polymers or copolymers may be chlorinated in the same manner.

A sulfurized methyl pentadiene polymer produced as in Example I was a reddish-brown, viscous liquid, easily soluble in lubricating oils. It had a viscosity at 212° F. of 29.7 centistokes. It possessed a sulfur content of 11.55% w., of which 38.8 was "reactive sulfur" as determined by reacting the compound with metallic copper for 16 hours at 170° C. Its molecular weight was approximately 500, showing it to contain approximately six monomer units (probably a mixture of 6 and 7).

Amounts of this sulfurized polymer, of sulfurized sperm oil, and of paraffin wax disulfides sufficient to give approximately 0.1% added sulfur in each case, were added to samples of a commercial aviation lubricating oil to which had been added 0.5% w. crankcase catalyst (centrifuged sediment from automotive crankcase oil prepared according to Larsen et al., Industrial and Eng. Chemistry, vol. 35, page 581, 1943).

The accelerated oxidation periods (Dornte apparatus) of the respective samples at 150° C. were as follows:

| | Hours |
|---|---|
| Sulfurized cyclic methyl pentadiene polymer | 70.0 |
| Wax disulfide | 35.7 |
| Sulfurized sperm oil | 28.6 |
| No additive | 22.5 |

The doped and undoped oils were then further tested by a test known as the Thrust bearing corrosion test (described in the National Petroleum News September 18, 1941, pp. R294–296), which is carried out as follows: A hardened steel disc is made to rotate for 20 hours under constant pressure against three flat copper-lead bearings. The bearing assembly rests in a steel cup filled with the oil to be tested, and the temperature of the oil is maintained at a predetermined figure (here 170° C.) by thermostatic control. The bearings are weighed before and after the test, the difference in weight representing the loss sustained during the test. These oil samples contained additionally 0.1% (based on added sulfur as determined by sulfate ash) of the determolecular weights up to 500,000 or more are soluble in lubricating oil, this solubility is decreased by the incorporation of considerable amounts of sulfur or chlorine, so that for polymers above about 20,000 or 30,000 molecular weight the sulfur or chlorine incorporated therein is preferably on the order of a few percent (e. g. 1%, 2% or up to about 5%). Thus, from the viewpoint of oil-solubility, those sulfurized and/or chlorinated linear polymers having a molecular weight from about 1000 to about 20,000 or 30,000 are more desirable.

Sulfurization of the present polymers may be carried out with elemental sulfur or by employing suitable sulfur-containing reagents such as sulfur monochloride, sulfur dichloride, phosphorus sulfides such as $P_2S_3$, $P_2S_5$, $P_4S_7$, $P_4S_3$, etc. When treating with phosphorus sulfide, a residual amount of phosphorus, on the order of 0.001–0.1% w. in the polymer may also contribute to the oxidation stability of the product. Larger amounts, e. g. 1–2% or even up to 5% or more may also be incorporated if desired since phosphorus compounds also contribute anti-wear and anti-corrosive properties.

Since the reaction with sulfur is exothermic, the sulfur should be added to the polymer slowly, conveniently by starting at a moderately elevated temperature, for example, 160° C., which may then be maintained for an additional period of several hours.

Halogenation (such as chlorination) may, in general, be effected by dissolving the polymer in a suitable anhydrous inert solvent such as benzene, ethylene dichloride, dioxane, carbon tetrachloride, chloroform, etc., and reacting with chlorine at temperatures below about 100° C. Above this temperature the chlorine may react by substitution with evolution of HCl.

Sulfur and chlorine may also be introduced into the polymer simultaneously with such reagents as sulfur monochloride, sulfur dichloride, etc.

Chlorination may also be effected by the addition of hydrogen chloride, which serves simultaneously both to hydrogenate and to chlorinate the polymer.

Various aspects of the present invention may be illustrated by the following specific examples, which, however, are given by way of demonstration rather than of limitation.

*Example I.—Cycle polymerization*

7412 gm. conjugated methyl pentadiene and 5810 gm. $SO_2$ were charged to a steam-heated autoclave. The autoclave was heated at 100° C.–130° C. for 30 minutes and then vented. The reaction product consisted of two layers. The upper layer, the diolefin polymer, amounted to approximately an 80% conversion based on the methyl pentadiene charged. This methyl pentadiene polymer was separated and refluxed to crack out any 2,4-dimethyl-3-sulfolene dissolved in the polymer and also to remove any $SO_2$ dissolved in the polymer. The polymer was then washed with a 10% NaOH solution at 100° C. to remove the last traces of $SO_2$ followed by two water washes to remove the NaHO and $NaHSO_3$ present. The water was then distilled off from the polymer.

The 2,4-dimethyl-3-sulfolene formed during such reaction may be converted to diolefin polymer in the following manner:

904 gm. 2,4-dimethyl-3-sulfolene was charged to a flask attached to a reflux condenser. The flask was heated at 90° C.–110° C. until cracking had ceased (3 hours) and then the kettle was heated until the temperature rose to 191° C. (7 hours). There was recovered 494 gms. diolefin polymer representing a 97.4% conversion. This polymer was freed from the free $SO_2$ in the same manner as described above.

*Example II.—Linear homo polymerization*

A mixture of 19 gm. of 2-methyl-1,3-pentadiene and 4-methyl-1,3-pentadiene was dissolved in 25 cc. of a mixture of isomeric pentanes and cooled to −100° C. There was then added dropwise with stirring a solution of 0.38 gm. of stannic chloride in a small amount of ethyl chloride. The mixture was promptly cooled to about −190° C. and stored for 2 hours. The conversion to polymer was approximately 100%. The mixture was poured into a large volume of acetone, whereby the polymer precipitated. It was separated by decantation, water-washed and dried under vacuum at room temperature. The polymer was light in color, had a molecular weight of 89,000 as determined by viscosity measurements and was extremely tough.

*Example III.—Linear homo polymerization*

A mixture of 360 gm. of 2-methyl-1,3-pentadiene and 4-methyl-1,3-pentadiene was dissolved in 1250 cc. n-butane and cooled to −77° C. with solid $CO_2$. There was then sprayed in with stirring a solution of 1.8 gm. aluminum chloride in a small amount of ethyl chloride. The mixture was stored for two hours and then worked up as described in Example II. The conversion to polymer was approximately 60%. The polymer was a light colored semi-solid which had a molecular weight of 25,000 as determined by viscosity measurements.

*Example IV.—Linear homo polymerization*

A mixture of 400 gm. of methyl pentadienes was dissolved in 1500 cc. methyl chloride. The temperature of the mixture was −21° C. There was then sprayed in with stirring a solution of 2 gm. aluminum chloride in a small amount of ethyl chloride. The reaction mixture was stored for two hours and then worked up as described in Example II. The conversion to polymer was approximately 99%. The polymer was a light colored, very soft solid which had a molecular weight of 51,000 as determined by viscosity measurements.

*Example V.—Linear homo polymerization*

A mixture of 288 gm. of methyl pentadienes was dissolved in 800 cc. ethylene. The temperature of the mixture was −100° C. A small amount of $BF_3$ together with ethyl chloride was injected with an aspirator. The reaction mixture was stored for two hours and then worked up as described in Example II.

The conversion to polymer was approximately 82%. The polymer was a clear water-white semi-solid which had a molecular weight of 33,000 as determined by viscosity measurements.

*Example VI.—Linear copolymerization*

In each case 100 parts by weight of the mixture of conjugated methyl pentadienes with butadiene or isoprene, together with diazoaminobenzene, 1 part, as catalyst, was emulsified in water, 180 parts, containing a pure neutral white soap, 5.1 parts, as an emulsifying agent and an organic dispersing agent as protective colloid. The emulsion was maintained at 90° C. for the indicated period, following which the emulsion was broken by the addition of an electrolyte. The gent, calcium salt of methylene bis p-iso-octyl phenol.

The weight loss of the bearings (mg./cm.$^2$) for 20 hours at 125 p. s. i. thrust and 2400 R. P. M. for these samples were:

| | | |
|---|---|---|
| Sulfurized cyclic methyl pentadiene polymer | −0.1, | 0.1 |
| Wax disulfide | −0.4, | −0.4 |
| Sulfurized sperm oil | 0.2, | 0.1 |
| No additive | 22.0, 29.7, 26.3 | |

The accelerated oxidation period was also obtained according to the above procedure on a sulfurized methyl pentadiene linear polymer obtained according to Example X. This particular sample contained 11.67% w. sulfur and had a molecular weight of 8000 as determined by viscosity measurements. A commercial aviation lubricating oil to which had been added 0.86% w. of the polymer (0.1% added sulfur content) and 0.5% w. crankcase catalyst showed an oxidation life of 106 hours at 150° C. in the Dornte apparatus.

A similar sample containing 1 cm.$^2$ copper per gram of oil in place of the crankcase catalyst gave an oxidation life of 36 hours with the linear polymer and 50 hours with the cyclic polymer.

Two percent of this linear polymer in hydrol was heated in the presence of a copper strip for 16 hours at 100° C. without any discoloration of the copper taking place.

When the sulfurized poymers are employed principally for their antioxidant properties, amounts of about 0.01% to 1% w. based on added sulfur are generally indicated, although higher amounts on the order of 2% or 3% or even 5% or more may be used. If the sulfurized or chlorinated polymers are employed for their extreme pressure properties, amounts between about 1% and 20% w. based on added sulfur or from 0.1% to 20% w. based on added halogen are generally adequate.

The nature of the lubricant in which the present additives are incorporated will, of course, depend upon the particular use to which it is to be put. For lubricating heavily loaded gears or in other application in which high film strength is required, a more viscous oil or grease will be applied than would be used to lubricate a crankcase. Likewise, the lubricant most commonly used is refined mineral oil or petroleum; however, this may be replaced in whole or in part by vegetable, animal or fish oils such as cottonseed oil, maize oil, olive oil, palm oil, castor oil, soya bean oil, jojoba oil, lard, tallow, degras, sperm oil, whale oil, etc., as well as by so-called synthetic lubricants such as polymerized olefins, esters, ethers, etc.

When the sulfurized and/or chlorinated high molecular weight polymers are employed in organic compositions such as lubricating oil, in addition to the beneficial properties conferred by the sulfur or chlorine, the polymer acts as a bodying agent for the organic media. Thus, small amounts, generally less than 10% based on the weight of the oil, of such polymers having a molecular weight of upwards of about 50,000 have a notable effect on the viscosity index of an oil. The term "viscosity index" ("V.I.") refers to the comparative viscosity-temperature relationship as defined by Dean and Davis in Chem. and Met. Eng., 36, 618 (1929).

The present additives may be incorporated advantageously in extreme pressure lubricants, cutting oils, roll oils, wire drawing lubricants, greases, hypoid gear lubricants, and, especially the sulfurized polymers, may be employed in lubricants for bearings, in particular modern alloy bearings such as cadmium-silver, cadmium-nickel, copper-lead, "high lead" alloys as well as Babbitt metal, and the like. They may also be used to impart anti-wear and/or anti-oxidant properties to lubricants not necessarily subject to high pressure. In addition, by reason of their anti-oxidant properties the sulfurized polymers may be incorporated advantageously in organic substances not intended for use as as lubricants at all, such as gasoline, kerosene, spray oil, medicinal oil, transformer or electrical insulating oil, cleaning fluid, synthetic or natural rubber, resins, waxes, Diesel fuel, photographic developers, added to rubber cements, etc.

Particular reference may be made to the inclusion of the herein described anti-oxidants as additives for coating materials such as asphalt, resins, oils, waxes, varnish, insulating or moisture-protective substances such as oiled or "waxed" paper, etc. Such plastic or semi-plastic vehicles may also contain, for example, anti-rusting agents and be applied to metal surfaces to provide a corrosion-resistant coating. Also such oxidation inhibited adhesion coatings may be applied to wood, paper, cardboard, felt, stone, laminated glass, fabric, concrete, plastic compositions, etc. (asbestos board), by such methods as roller coating, dipping, brushing, spraying and the like.

The present sulfurized and/or chlorinated polymers may also be advantageously used in connection with other additives in lubricating media, for example, detergents formed from the oil-soluble salts of various bases with detergent forming acids. Such bases include metallic as well as organic bases. Metallic bases include those of the alkali metal, as well as Cu, Mg, Ca, Sr, Ba, Zn, Cd, Al, Sn, Pb, Cr, Mn, Fe, Ni, Co, etc. Organic bases include various nitrogen bases as primary, secondary, tertiary and quarternary amines.

Examples of detergent forming acids are the various fatty acids of, say, 10 to 30 carbon atoms, wool fat acids, paraffin wax acids (produced by oxidation of paraffin wax), chlorinated fatty acids, aromatic carboxylic acids including aryl fatty acids, aryl hydroxy fatty acids, paraffin wax benzoic acids, various alkyl salicyclic acids, phthalic acid mono esters, aromatic keto acids, aromatic ether acids; diphenols as di-(alkyl phenol) sulfides and disulfides, methylene bis alkylphenols; sulfonic acids such as may be produced by treatment of alkyl aromatic hydrocarbons or high boiling petroleum oils with sulfuric acid; sulfuric acid mono esters; phosphoric acid mono and di-esters, including the corresponding thiophosphoric acids; phosphonic and arsonic acids, etc.

Non-metallic detergents include compounds such as the phosphatides (e. g. lecithin), certain fatty oils as rapeseed oils, voltolized fatty or mineral oils.

Other detergents are the alkali earth phosphate di-esters, including the thiophosphate di-esters; the alkali earth diphenolates, specifically the calcium and barium salts of diphenol mono and poly sulfides; etc.

Particularly effective detergents are the polyvalent metal salts of the resinous condensation products of low molecular weight aldehydes (such as HCHO, CH$_3$CHO, etc.) with alkylated aryl hydroxy products (such as alkyl phenol, alkyl naphthol, etc.). They may be typified by the calcium salt of the reaction product of formaldehyde and iso-octyl phenol

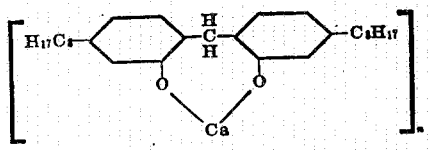

wherein $n$ is a small integer such as 2, 3 or 4 or the product is a mixture of such polymers.

The present additives may also be used in association with other anti-oxidants, for example, alkyl phenols such as 2,4,6-trimethylphenol, pentamethylphenol, 2,4-dimethyl-6-tertiary-butylphenol, 2,4-dimethyl-6-octylphenol, 2,6-di-tertiary-butyl-4-methylphenol, 2,4,6 - tri-tertiary-butylphenol, etc.; amine phenols as benzyl amino phenols; amines such as dibutylphenylenediamine, diphenylamine, phenyl-alpha-naphthylamine, phenyl-beta-naphthylamine, dinaphthyl amines; etc.

Other sulfur-containing anti-oxidants may also be present. These should have a minimum of about 10 carbon atoms. Such anti-oxidant sulfur may be in the form of mercaptans, as in decyl mercaptans, dodecyl mercaptans, cetyl mercaptans, oleyl mercaptans, stearyl mercaptans; butyl or other higher alkyl thiophenes; thionaphthols, alkyl thionaphthols, etc.; or of polysulfides ($R(SS)_xR'$ as in diamyl disulfide and higher dialkyl disulfides, e. g. diphenyl disulfides, dibenzyl disulfide, dinaphthyl disulfides, wax polysulfide formed by reaction of polychlorinated wax and sodium polysulfide, etc.); or of sulfur compounds formed by attaching sulfur to an olefinic double bond (as by reacting sulfur with olefins at temperature of about 150° C. to 300° C.) which compounds are believed to contain the structure

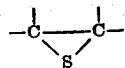

(sulfur in epithio linkage).

Other corrosion inhibitors may also be present such as dicarboxylic acids of 16 and more carbon atoms, alkali metal and alkali earth salts of sulfonic acids and fatty acids, mono carboxylic acids containing a minimum of about 12 carbon atoms and having a nitro, nitroso, nitrile, mercapto, or aryl sulfonyl group attached to the alpha or beta carbon atom, etc.

Likewise, other additives may be present in a lubricating oil or grease such as blooming agents, anti-foaming agents, other viscosity index improvers, pour point depressants, etc.

The invention claimed is:

1. An organic hydrocarbon composition comprising a beneficial amount sufficient to stabilize said organic composition against deterioration and oxidation of a sulfurized homopolymer of an alkyl-substituted 1,3-pentadiene, said alkyl substituent of 1,3-pentadiene having up to two carbon atoms.

2. An organic hydrocarbon composition comprising a beneficial amount sufficient to stabilize said organic composition against deterioration and oxidation of a sulfurized cyclic homopolymer of an alkyl-substituted 1,3-pentadiene, said alkyl substituent of 1,3-pentadiene having up to two carbon atoms.

3. An organic hydrocarbon composition comprising a beneficial amount sufficient to stabilize said organic composition against deterioration and oxidation of a sulfurized linear homopolymer of an alkyl-substituted 1,3-pentadiene, said alkyl substituent of 1,3-pentadiene having up to two carbon atoms.

4. An organic hydrocarbon composition to which has been added a beneficial amount sufficient to stabilize said organic composition against deterioration and oxidation of a sulfurized linear copolymer of an alkyl-substituted 1,3-pentadiene, said alkyl substituent of 1,3-pentadiene having up to two carbon atoms and of an unsaturated hydrocarbon containing at least two sets of unsaturated linkages in the molecule.

5. The composition according to claim 12 wherein the polymer is a linear polymer having a molecular weight of between about 1,000 and 20,000.

6. A lubricating composition comprising a mineral oil and an anti-oxidant amount of a sulfurized cyclic homopolymer of an alkyl-substituted 1,3-pentadiene, said alkyl substituent of 1,3-pentadiene having up to two carbon atoms.

7. A lubricating composition comprising a mineral oil and an anti-oxidant amount of a sulfurized cyclic homopolymer of a conjugated methyl pentadiene-1,3, said homopolymer boiling above about 250° C. and having a sulfur content of between about 8% and about 15% by weight.

8. The composition according to claim 7 wherein the sulfurized homopolymer is present in such an amount that the sulfur content in the composition is between about 0.01% and about 5% by weight.

9. A lubricating composition comprising a mineral oil and a beneficial amount sufficient to stabilize said mineral oil against deterioration and oxidation of a sulfurized copolymer of an alkyl-substituted 1,3-pentadiene, said alkyl substituent of 1,3-pentadiene having up to two carbon atoms and of an unsaturated hydrocarbon containing at least two sets of unsaturated linkages in the molecule.

10. A lubricating composition comprising a mineral oil and a minor but sufficient amount to stabilize said mineral oil composition against deterioration and oxidation of a sulfurized copolymer of an alkyl-substituted 1,3-pentadiene, said alkyl substituent of 1,3-pentadiene having up to two carbon atoms and of a butadiene.

11. An organic hydrocarbon composition comprising a beneficial amount, sufficient to stabilize said organic composition against deterioration and oxidation of a sulfurized polymer selected from the group consisting of homopolymers of an alkyl substituted 1,3-pentadiene and copolymers of said alkyl substituted 1,3-pentadiene with hydrocarbons possessing at least two sets of unsaturated linkages in the molecule, said alkyl substituent of the 1,3-pentadiene having up to two carbon atoms.

12. A lubricating composition comprising a mineral oil and a beneficial amount, sufficient to stabilize said mineral oil against deterioration and oxidation of a sulfurized polymer selected from the group consisting of a homopolymers of alkyl substituted 1,3-pentadiene and copolymers of said alkyl substituted 1,3-pentadiene with hydrocarbons possessing at least two sets of unsaturated linkages in the molecule, said alkyl substituent of the 1,3-pentadiene having up to two carbon atoms.

RUPERT C. MORRIS.
JOHN L. VAN WINKLE.
ALVA V. SNIDER.

(References on following page)

REFERENCES CITED

The following references are of record in the file of this patent:

UNITED STATES PATENTS

| Number | Name | Date |
|---|---|---|
| 2,406,575 | Young et al. | Aug. 27, 1946 |
| 2,356,129 | Sparks | Aug. 22, 1944 |
| 2,316,190 | Kelso | Apr. 6, 1943 |
| 2,316,089 | Anderson | Apr. 6, 1943 |
| 2,234,204 | Starkweather et al. | May 11, 1941 |
| 2,142,980 | Huyser | Jan. 3, 1939 |
| 1,234,381 | Peachey | July 24, 1917 |
| 1,074,432 | Hofmann et al. | Sept. 30, 1913 |

OTHER REFERENCES

Bachman et al., article in J. Am. Chem. Soc., 64, April 1942.